United States Patent
Chan et al.

(10) Patent No.: US 8,666,816 B1
(45) Date of Patent: Mar. 4, 2014

(54) METHOD AND SYSTEM FOR ACCESS POINT CUSTOMIZATION

(75) Inventors: Wesley T. Chan, Mountain View, CA (US); Shioupyn Shen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1609 days.

(21) Appl. No.: 10/941,491

(22) Filed: Sep. 14, 2004

(51) Int. Cl.
*G06Q 30/00* (2012.01)

(52) U.S. Cl.
USPC ........................................ 705/14.64

(58) Field of Classification Search
None
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,012,088 A * | 1/2000 | Li et al. | 709/219 |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,201,962 B1 | 3/2001 | Sturniolo et al. | |
| 6,243,450 B1 | 6/2001 | Jansen et al. | |
| 6,269,361 B1 | 7/2001 | Davis et al. | |
| 6,401,075 B1 | 6/2002 | Mason et al. | |
| 6,424,706 B1 * | 7/2002 | Katz et al. | 379/144.01 |
| 6,452,498 B2 | 9/2002 | Stewart | |
| 6,522,881 B1 * | 2/2003 | Feder et al. | 455/437 |
| 6,640,097 B2 | 10/2003 | Corrigan et al. | |
| 6,671,735 B1 | 12/2003 | Bender | |
| 6,725,022 B1 * | 4/2004 | Clayton et al. | 455/154.1 |
| 6,728,531 B1 | 4/2004 | Lee et al. | |
| 6,732,141 B2 | 5/2004 | Ellis | |
| 6,732,150 B1 | 5/2004 | Thrane | |
| 6,829,475 B1 * | 12/2004 | Lee et al. | 455/419 |
| 6,831,921 B2 | 12/2004 | Higgins | |
| 6,847,992 B1 | 1/2005 | Haitsuka et al. | |
| 6,928,615 B1 | 8/2005 | Haitsuka et al. | |
| 6,950,804 B2 * | 9/2005 | Strietzel | 705/26 |
| 6,983,139 B2 | 1/2006 | Dowling et al. | |
| 6,983,311 B1 * | 1/2006 | Haitsuka et al. | 709/217 |
| 6,985,882 B1 | 1/2006 | Del Sesto | |
| 6,986,030 B2 | 1/2006 | Shmueli et al. | |
| 7,016,328 B2 | 3/2006 | Chari et al. | |
| 7,039,599 B2 | 5/2006 | Merriman | |
| 7,042,988 B2 | 5/2006 | Juitt et al. | |

(Continued)

FOREIGN PATENT DOCUMENTS

| | | |
|---|---|---|
| EP | 1 067 470 | 1/2001 |
| EP | 1 180 873 | 2/2002 |

(Continued)

OTHER PUBLICATIONS

U.S. Appl. No. 95/001,073, filed Sep. 30, 2004, Stone et al.

(Continued)

*Primary Examiner* — Colleen Hoar
(74) *Attorney, Agent, or Firm* — Fish & Richardson P.C.

(57) ABSTRACT

In one embodiment, information pertaining to preferences of end users with respect to network access is received from a first entity, and properties of one of wireless access points (WAPs) are then configured based on the information pertaining to the preferences of end users.

18 Claims, 7 Drawing Sheets

(56) References Cited

U.S. PATENT DOCUMENTS

| | | | |
|---|---|---|---|
| 7,058,387 | B2 | 6/2006 | Kumar et al. |
| 7,058,594 | B2 | 6/2006 | Stewart |
| 7,062,469 | B2 * | 6/2006 | Meyers et al. ............... 705/64 |
| 7,072,967 | B1 | 7/2006 | Saulpaugh et al. |
| 7,103,313 | B2 | 9/2006 | Heinonen et al. |
| 7,136,875 | B2 | 11/2006 | Anderson et al. |
| 7,254,614 | B2 | 8/2007 | Mulligan et al. |
| 7,310,664 | B1 * | 12/2007 | Merchant et al. ............ 709/220 |
| 7,382,778 | B2 | 6/2008 | Chari et al. |
| 7,471,661 | B1 | 12/2008 | Wang et al. |
| 7,487,112 | B2 | 2/2009 | Barnes, Jr. |
| 7,499,401 | B2 | 3/2009 | Buddhikot et al. |
| 7,516,177 | B2 | 4/2009 | Knapp et al. |
| 7,599,851 | B2 * | 10/2009 | Frengut et al. ............ 705/14.26 |
| 7,693,827 | B2 | 4/2010 | Zamir et al. |
| 7,716,161 | B2 | 5/2010 | Dean et al. |
| 7,720,044 | B1 * | 5/2010 | Rainisto ..................... 370/349 |
| 2002/0007303 | A1 | 1/2002 | Brookler et al. |
| 2002/0046104 | A1 * | 4/2002 | Kaddeche et al. ............. 705/14 |
| 2002/0059614 | A1 | 5/2002 | Lipsanen et al. |
| 2002/0087335 | A1 | 7/2002 | Meyers et al. |
| 2002/0099854 | A1 | 7/2002 | Jorgensen |
| 2002/0120507 | A1 | 8/2002 | Chanos et al. |
| 2002/0188527 | A1 | 12/2002 | Dillard et al. |
| 2002/0194065 | A1 * | 12/2002 | Barel et al. .................. 705/14 |
| 2003/0043773 | A1 | 3/2003 | Chang et al. |
| 2003/0046091 | A1 * | 3/2003 | Arneson et al. ................. 705/1 |
| 2003/0087629 | A1 | 5/2003 | Juitt et al. |
| 2003/0110503 | A1 | 6/2003 | Perkes |
| 2003/0126595 | A1 * | 7/2003 | Sie et al. ..................... 725/29 |
| 2003/0163369 | A1 * | 8/2003 | Arr ............................. 705/14 |
| 2003/0182431 | A1 | 9/2003 | Sturniolo et al. |
| 2003/0187985 | A1 | 10/2003 | Rohling |
| 2003/0200321 | A1 | 10/2003 | Chen et al. |
| 2004/0003402 | A1 | 1/2004 | McKenna, Jr. |
| 2004/0015607 | A1 | 1/2004 | Bender et al. |
| 2004/0044622 | A1 | 3/2004 | Blott et al. |
| 2004/0064367 | A1 | 4/2004 | McKee, Jr. et al. |
| 2004/0068668 | A1 | 4/2004 | Lor et al. |
| 2004/0102182 | A1 * | 5/2004 | Reith et al. ................ 455/410 |
| 2004/0116115 | A1 | 6/2004 | Ertel |
| 2004/0117195 | A1 * | 6/2004 | Bodin ............................. 705/1 |
| 2004/0143652 | A1 | 7/2004 | Grannan et al. |
| 2004/0186775 | A1 | 9/2004 | Margiloff et al. |
| 2004/0198386 | A1 | 10/2004 | Dupray |
| 2004/0240445 | A1 | 12/2004 | Shin et al. |
| 2004/0260760 | A1 | 12/2004 | Curnyn |
| 2005/0010475 | A1 | 1/2005 | Perkowski et al. |
| 2005/0049887 | A1 | 3/2005 | Bulleit et al. |
| 2005/0071328 | A1 | 3/2005 | Lawrence |
| 2005/0073979 | A1 | 4/2005 | Barber et al. |
| 2005/0078624 | A1 * | 4/2005 | Shu et al. ................... 370/328 |
| 2005/0102529 | A1 | 5/2005 | Buddhikot et al. |
| 2005/0105491 | A1 | 5/2005 | Chaskar et al. |
| 2005/0114520 | A1 | 5/2005 | White et al. |
| 2005/0135315 | A1 * | 6/2005 | Sinha .......................... 370/338 |
| 2005/0198353 | A1 | 9/2005 | Zmrzli |
| 2005/0208929 | A1 | 9/2005 | Zmrzli |
| 2005/0208930 | A1 | 9/2005 | Zmrzli |
| 2005/0213597 | A1 | 9/2005 | McNulty |
| 2006/0058019 | A1 | 3/2006 | Chan et al. |
| 2006/0059043 | A1 | 3/2006 | Chan et al. |
| 2006/0059044 | A1 | 3/2006 | Chan et al. |
| 2006/0218296 | A1 | 9/2006 | Sumner |
| 2007/0112948 | A1 | 5/2007 | Uhlik |

FOREIGN PATENT DOCUMENTS

| | | |
|---|---|---|
| EP | 1 355 448 | 10/2003 |
| JP | 2003-067630 | 3/2003 |
| JP | 2003-067652 | 3/2003 |
| JP | 2003-150841 | 5/2003 |
| JP | 2004-070884 | 3/2004 |
| JP | 2004-102470 | 4/2004 |
| JP | 2004-185389 | 7/2004 |
| WO | WO 97/21183 | 6/1997 |
| WO | 01/37517 | 5/2001 |
| WO | 2004/029758 | 4/2004 |
| WO | 2004/054299 | 6/2004 |

OTHER PUBLICATIONS

U.S. Appl. No. 95/001,061, filed Sep. 3, 2002, Stone et al.
U.S. Appl. No. 95/001,069, filed Jul. 11, 2002, Dean et al.
U.S. Appl. No. 95/001,068, filed Dec. 7, 2002, Stone et al.
AdForce, Inc., A Complete Guide to AdForce. Version 2.6, 1998.
AdForce, Inc., S-I/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb 1, 1997.
Baseview Products, Inc., AdManagerPro Administration Manual v. 2.0, Dec. 1998.
Baseview Products, Inc., ClassManagerPro Administration Manual v. 1.0.5. Feb. 1, 1997.
Business Wire, "Global Network, Inc. Enters Into Agreement in Principle With Major Advertising Agency," Oct. 4, 1999.
Information Access Technologies, Inc., Aaddzz brochure. "The Best Way to Buy and Sell Web Advertising Space," © 1997.
Information Access Technologies, Inc., Aaddzz.com website archive from www. Archive.org, archived on Jan. 30, 1998.
Zeff, R. et al., *Advertising on the Internet*, $2^{nd}$ Ed., John Wiley & Sons, 1999.
Dedrick, R., Interactive Electronic Advertising, IEEE, 1994.
Dedrick, R., A Consumption Model for Targeted Electronic Advertising, Intel Architecture Labs. IEEE. 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Statement Regarding References in 1449 Form.
JiWire website from Sep. 10, 2004, Hotspot Availability and Sponsors.
Current JiWire website, Information on Advertising Subsidized Municipal Networks.
Perkins, Charles E., "Mobile Networking through Mobile IP," IEEE Internet Computing, Tutorial, pp. 58-69.
Yunos, et al., "Wireless Advertising's Challenges and Opportunities," 2003 IEEE, 0018-9162/03, pp. 30-37.
Authorized officer Stylianos Vasilakis, International Search Report and Written Opinion in PCT/US2005/029788, mailed Dec. 20, 2005, 17 pages.
Authorized officer Athina Nickitas-Etienne, International Preliminary Report on Patentability in PCT/US2005/029788, mailed Mar. 29, 2007, 10 pages.
Authorized officer Ainhoa Barrio Baranano, International Search Report and Written Opinion in PCT/US2005/029713, mailed Jan. 18, 2006, 14 pages.
Authorized officer Athina Nickitas-Etienne, International Preliminary Report on Patentability in PCT/US2005/029713, mailed Mar. 29, 2007, 9 pages.
Authorized officer Selwa Harris, International Search Report and Written Opinion in PCT/US2005/029714, mailed Jan. 11, 2006, 14 pages.
Authorized officer Athina Nickitas-Etienne, International Preliminary Report on Patentability in PCT/US2005/029714, mailed Mar. 29, 2007, 8 pages.
JP Office Action (with English translation) as mailed Sep. 13, 2010 from Japan Patent Office for JP Patent Application No. 2007-532344, 9 pgs.

(56) References Cited

OTHER PUBLICATIONS

JP Office Action (with English Translation) as mailed Feb. 28, 2011 from Japan Patent Office for JP Patent Application No. 2007-532344, 7 pgs.

KR Office Action (English translation only) dated Jan. 19, 2012 from Korean Patent Office for KR Patent Application No. 2007-7008055, 3 pgs.

"Wi-Fi Hotspot Finder, Product Review, and Industry News", Hotspot Availability and Sponsors, JiWire website [online]. Sep. 10, 2004. [retrieved on Jan. 7, 2008]. Retrieved from the Internet: <URL: http://web.archive.org/web/20040910001718/http://www.jiwire.com/>, 2 pages.

\* cited by examiner

METHOD AND SYSTEM FOR ACCESS POINT CUSTOMIZATION

FIELD OF INVENTION

The field of invention relates generally to wireless data communication, and more particularly, to facilitating customization of an access point.

BACKGROUND

Mobile computer users are able to enjoy wireless Internet access at various wireless access points (WAPs), commonly referred to as WiFi access points. The WiFi access points are wireless access points that are compatible with IEEE 802.11, as certified by the Wireless Fidelity (WiFi) Alliance.

Usually, WiFi operators deploy WiFi access points at high traffic locations to meet the need of mobile users. The cost of WiFi Internet access is relatively high because WiFi operators need to recoup their investment in deployment and maintenance of access points and make some profits.

An access point can serve multiple users within a defined network area. As users move beyond the range of one access point, they need to be handed over to the next access point. Typically, the next access point is the first access point detected by the mobile device in the geographical area in question. However, the detected access point may have service characteristics undesirable for the user. For example, the detected access point may not provide a sufficient level of security or a sufficient speed of network connection.

Because of these and other limitations, many mobile users are reluctant to pay a premium price for WiFi Internet access. Therefore, WiFi Internet access as an industry has experienced a rather slow start.

Thus, what is desired is a method or system that helps overcome one or more of the above-described limitations.

SUMMARY

In one embodiment, information pertaining to preferences of end users with respect to network access is received from a first entity, and properties of one of wireless access points (WAPs) are then configured based on the information pertaining to the preferences of end users.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Overview of One Embodiment

Figure 1:
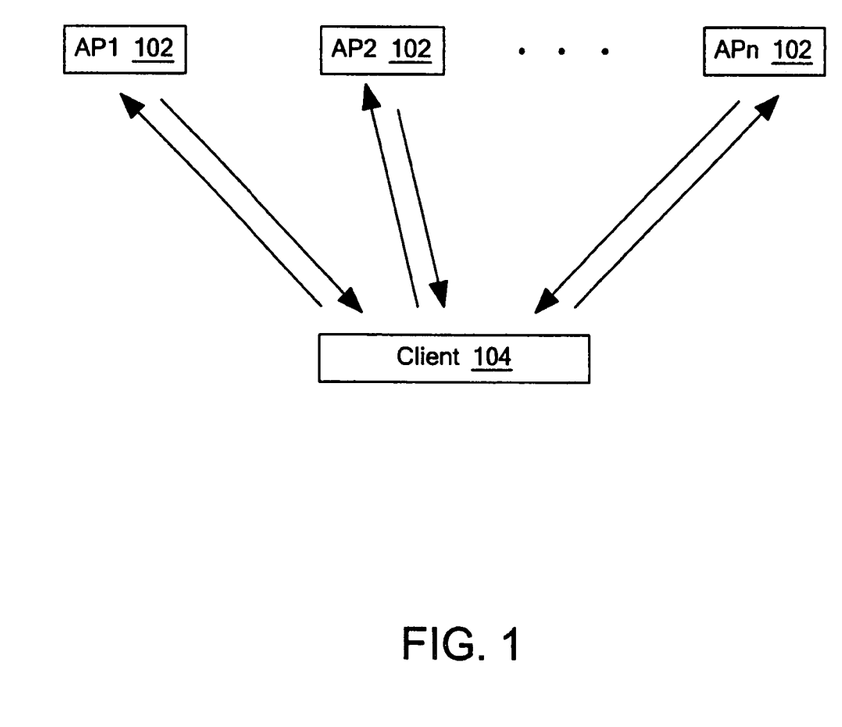
FIG. 1 presents a diagram illustrating an overview of one embodiment of the present invention.

A method and system for facilitating customization of an access point is described. FIG. 1 presents a diagram illustrating an overview of one embodiment of the present invention.

Referring to FIG. 1, access points 102 (AP1 through APn) can provide network access (e.g., Internet access) to various client devices, including a client 104. In one embodiment, the access points 102 are wireless access points that are compatible with IEEE 802.11, as certified by the Wireless Fidelity (WiFi) Alliance. The client 104 may be a mobile device such as a portable computer, a personal digital assistant (PDA), a mobile phone, etc. The client 104 may be coupled to the access points 102 via one or more wireless networks (e.g., wireless local area networks (WLANs)).

In order to receive access to the Internet, the clients 104 connect to respective access points 102. A user of each client 104 provides his or her preferences with respect to network access including an expected web browsing experience. These user preferences may specify, for example, a maximum number of ads to be displayed on the screen of the client 104 while the user navigates the web, a desired speed of Internet connection, a desired level of security, a desired type of network connection (e.g., digital subscriber line (DSL), cable modem, etc.), etc.

In one embodiment, each access point 102 receives information pertaining to user preferences with respect to network access, and configures its properties based on the received information. For example, an access point 102 may limit the number of ads to be displayed on a screen to 3 upon receiving information indicating that a large number of users do not wish to see more than 3 ads on the screen when browsing the Internet.

References throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

System Architecture

Figure 2:
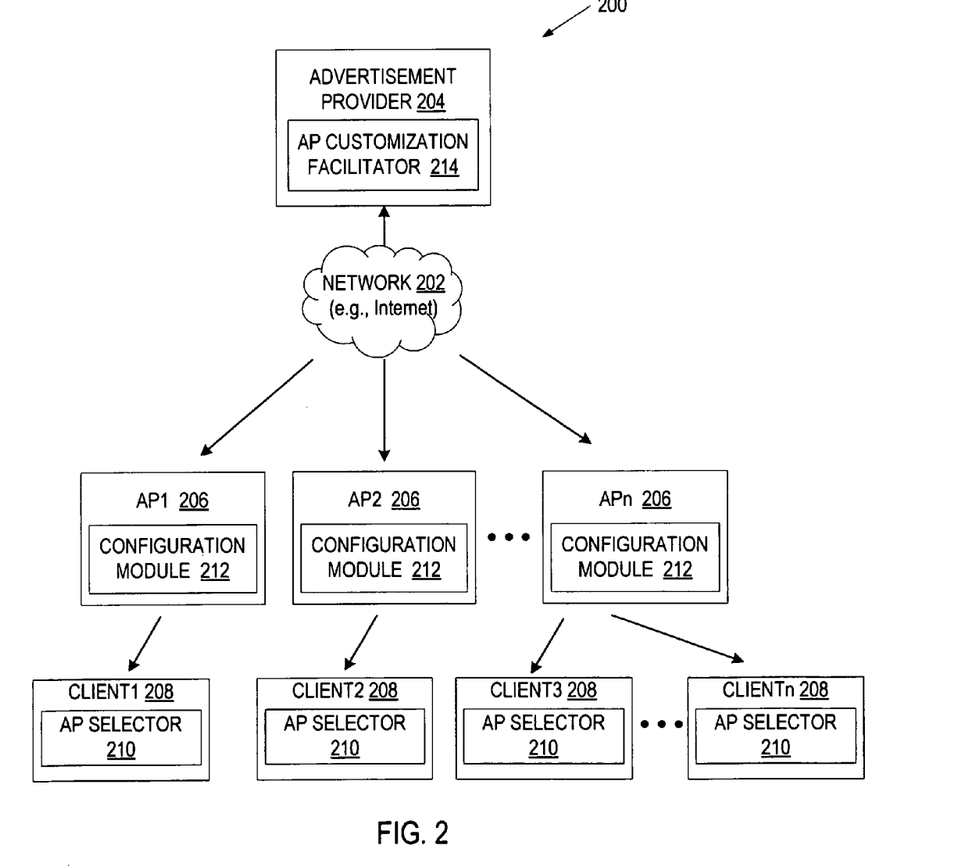
FIG. 2 is a block diagram illustrating an architecture in which one embodiment of the present invention may be implemented.

FIG. 2 is a block diagram illustrating an architecture 200 in which one embodiment of the present invention may be implemented. The architecture 200 includes multiple client devices 208 (client 1 through client N), multiple access points 206 (AP1 through APn), an advertisement provider 204, and a network 202, which may be, for example, the Internet.

The access points 206 may be disparate WAPs supplied by different providers to enable access to the network 202 for the clients 208. In one embodiment, traffic outgoing from, and incoming to, the access points 206 passes through the advertisement provider 204. The advertisement provider 204 is an entity distinct from the WAP providers that acts as a gateway by receiving the traffic outgoing from, and incoming to, the access points 206 and forwarding the received traffic to requested destinations. In one embodiment, the advertisement provider 204 collects advertisements from different advertisers and causes the advertisements to be presented to the users of client devices 208 when the users navigate the web. The collection and presentation of advertisements is described in more detail in the U.S. patent application entitled "Method and System to Provide Advertisements Based on Wireless Access Points", Ser. No. 10/941,431, filed Sep. 14, 2004, which is hereby incorporated by reference.

The advertisement provider 204 may be a wireless Internet service provider (WISP), a virtual Internet service provider (VISP), an online service provider (OSP), or any other entity capable of providing the above-mentioned functionality.

As discussed above, the advertisement provider 204 may act as a gateway and receives all traffic outgoing from, and incoming to, the clients 208. In one embodiment, this is accomplished by the clients 208 either proxy through or establish a virtual private network (VPN) with the system of the advertisement provider 206. In alternative embodiments, alternative implementations may be used to cause network traffic to pass through the advertisement provider 206. For example, some alternative implementations include having the advertisement provider 206 provide its own access points, and/or providing a list of service set identifier-wired equivalent privacy (SSID-WEP) settings to be downloaded by the clients 208 to connect to any of the listed access points.

In one embodiment, the access points 206 provide network access to the clients 208 free of charge (or at a reduced price) in exchange to users' consent to receive ads. For example, the advertisements may be presented in a toolbar of a browser window displayed on the client's screen, within (or to the side of) the content displayed on the client's screen, etc. In one embodiment, the advertisement provider 202 receives revenue from advertisers for advertisements selected by (or displayed to) the clients 208 and shares this revenue with the access points 206. As a result, the access point providers may cover the expenses of deploying and maintaining access points 206 and may recoup a profit, while providing network access to the clients 208 at a reduced price (or free of charge).

In one embodiment, each client 208 includes an access point selector 210 that is responsible for maintaining user preferences with respect to network access and selecting an access point that matches the user preferences. The user preferences may specify, for example, a maximum number of ads to be presented on the user's screen, a desired speed of the provided connection, a desired level of security, a desired type of network connection, and/or various other desired network access characteristics. As shown, depending on the user preferences, different clients 208 may choose different access points 206 to gain network access for their users.

In one embodiment, the advertisement provider 206 includes an access point customization facilitator 214 that is responsible for collecting preferences of users of the clients 208, evaluating these preferences, and sending evaluation results to the access points 206. In one embodiment, the evaluation results include network access characteristics referenced in the user preferences and the number of users desiring these network access characteristics. In another embodiment, the evaluation results include network access characteristics desired by a large number of users.

In one embodiment, each access point 206 includes a configuration module 212 that is responsible for customizing the relevant access point 206 to compete with other access points 206 for a selection by the clients 208. In one embodiment, the configuration module 212 customizes the access point 206 based on data received from the access point customization facilitator 214. In particular, the configuration module 212 receives from the access point customization facilitator 214 information pertaining to preferences of end users utilizing any of the access points 206, and configures properties of the relevant access point 206 based on the received information.

In another embodiment, the configuration module 212 customizes the access point 206 based on data received directly from client devices 208. That is, the configuration module 212 only receives preferences of end users utilizing the relevant access point 206 from the corresponding client devices 208.

In one embodiment, the configuration module 212 configures properties of the access point 206 to provide network access characteristics desired by a large number of users. Exemplary properties of an access point may specify a maximum number of ads to be presented to a user on a screen, the speed of the provided connection, the level of security, the type of network connection (e.g., DSL or cable modem), etc. In one embodiment, the configuration module 212 stores the properties of the access point in a local database, and allows the access point provider to update the stored properties at any time.

Figure 3:
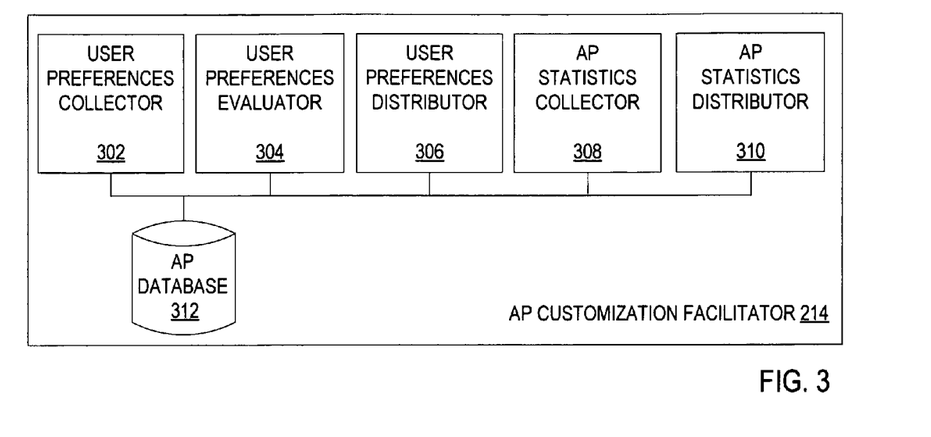
FIG. 3 is a block diagram of one embodiment of an access point customization facilitator.

FIG. 3 is a block diagram of one embodiment of an access point customization facilitator 214. The access point customization facilitator 214 includes a user preferences collector 302, a user preferences evaluator 304, a user preferences distributor 306, an access point statistics collector 308, an access point statistics distributor 310, and an access point database 312.

The user preferences collector 302 is responsible for receiving preferences of end users from multiple client devices and storing them in the access point database 312. The user preferences may specify, for example, a maximum number of ads presented on the user's screen, a desired speed of the provided connection, a desired level of security, a desired type of network connection, etc. In one embodiment, the user preferences collector 302 periodically requests user preferences from each client device when this client device is connected to the network. In another embodiment, the user preferences collector 302 receives user preferences from a client device each time the preferences maintained by the client device change.

The user preferences evaluator 304 is responsible for evaluating the user preferences to determine a number of end users desiring certain network access characteristics. In one embodiment, the user preferences evaluator 304 evaluates the user preferences at predetermined time periods. Alternatively, the user preferences evaluator 304 evaluates the user preferences upon receiving new preference information from a client device. In one embodiment, the user preferences evaluator 304 is also responsible for identifying network characteristics desired by a large number of end users (e.g., higher than a predefined percentage).

The user preferences distributor 306 is responsible for distributing user preference information to access points associated with the advertisement provider 206. In one embodiment, the user preference information identifies network access characteristics referenced in the user preferences and the number of users desiring the individual network access characteristics. In another embodiment, the user preference information identifies network access characteristics desired by a large number of users. In one embodiment, the user preferences distributor 306 distributes user preference information to a client device upon receiving a request for such information from the client device. Alternatively, the user preferences distributor 306 distributes the user preference information to all client devices at predetermined time intervals.

The access point statistics collector 308 is responsible for collecting statistics on the usage of access points by the end users. In one embodiment, the statistics specify how many end users selected this access point from the available access points and the preferences of these end users.

The access point statistics distributor 310 is responsible for sending access point usage statistics to relevant access points.

Figure 4:
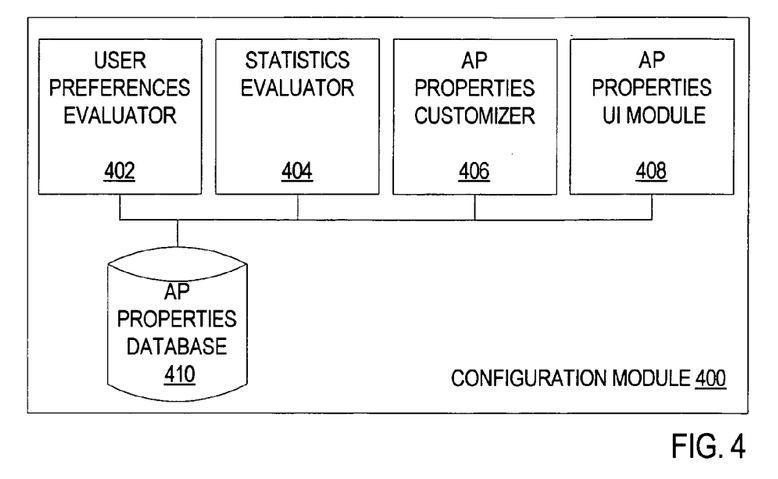
FIG. 4 is a block diagram of one embodiment of a configuration module.

FIG. 4 is a block diagram of one embodiment of a configuration module 400. The configuration module 400 may include a user preferences evaluator 402, an access point properties customizer 406, an access point properties user interface (UI) module 408, and an access point properties database 410.

The user preferences evaluator 402 is responsible for receiving information pertaining to preferences of end users with respect to network access (including the expected web browsing experience). In one embodiment, the information pertaining to the preferences of end users is received from client devices obtaining network access via the access point on which the configuration module 400 resides. The received information may then be a collection of preferences of users of these client devices.

In another embodiment, the information pertaining to the preferences of end users is received from the advertisement provider 206 that has collected this information from the client devices utilizing any of the access points associated with the advertisement provider 206. In one embodiment, the information received from the advertisement provider includes network access characteristics referenced in the user preferences and the number of users desiring the individual network access characteristics. In another embodiment, the information received from the advertisement provider includes network access characteristics desired by a large (e.g., over a predetermined percentage) number of end users.

In one embodiment, the user preferences evaluator 402 is also responsible for evaluating the information pertaining to end user preferences to determine which combination of network access characteristics is likely to attract a large number of end users.

In one embodiment, in which the configuration module 400 receives information from the advertisement provider 400, the configuration module 400 may also include a statistics evaluator 404 that is responsible for receiving statistics on usage of the access point by the client devices and evaluating the received statistics to determine whether the properties of the access point should be modified to attract more end users. In one embodiment, the statistics include the number of users that received network access via the access point and the preferences of these users.

The access point properties customizer 406 is responsible for configuring properties of the access point based on the evaluation results provided by the user preferences evaluator 402, and for storing the access point properties in the access point database 410. In one embodiment, the access point properties customizer 406 also uses the evaluation results provided by the statistics evaluator 404. In one embodiment, the access point properties customizer 406 periodically reconfigures the properties of the access point based on the evaluation results of the user preferences evaluator 402 (and/or the statistics evaluator 404 in some embodiments).

The access point properties UI module 408 is responsible for displaying access point properties and allowing the access point provider to modify the access properties.

Description of Process

Figure 5:
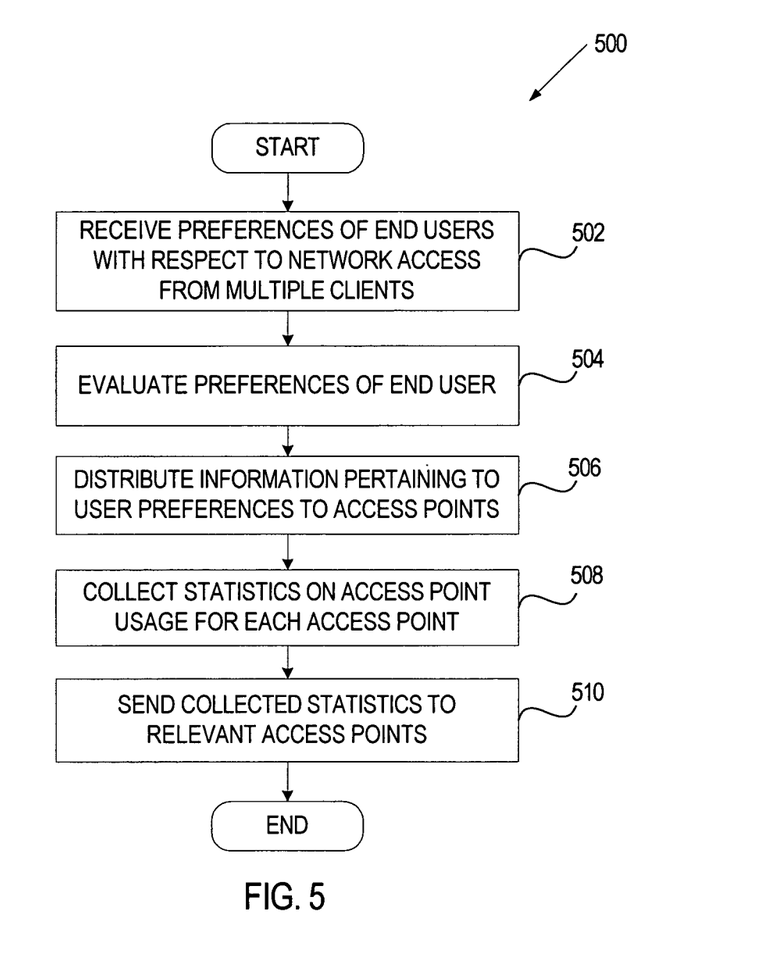
FIG. 5 presents a flow diagram of one embodiment of a method for providing user preferences information to access points.

FIG. 5 presents a flow diagram of one embodiment of a method 500 for providing user preferences information to access points. The method may be performed by processing logic, which may comprise hardware, software, or a combination of both. Processing logic may reside either in a server (e.g., an advertisement provider server), or partially or entirely in a separate device and/or system(s).

At block 502, processing logic receives preferences of end users with respect to network access from client devices. The preferences of end users may specify, for example, a maximum number of ads presented on the user's screen, a desired speed of the provided connection, a desired level of security, a desired type of network connection, and/or any other network access parameters.

At block 504, processing logic evaluates the preferences of the end users. In one embodiment, processing logic determines, for each network access characteristic referenced in the user preferences, the number of end users desiring the relevant network access characteristic. In one embodiment, processing logic also selects network access characteristics desired by a large (e.g., over a certain percentage) number of end users.

At block 506, processing logic distributes information pertaining to the end user preferences to multiple access points (e.g., multiple disparate WAPs supplied by different WAP providers). In one embodiment, the information pertaining to the end user preferences includes a list of network access characteristics and the number of end users desiring the individual network access characteristics. In another embodiment, the information pertaining to the end user preferences includes a list of network access characteristics desired by a large number of end users.

At block 508, processing logic collects statistics on access point usage for each access point associated with the server. In one embodiment, the statistics specify the number of end users that gained network access via this access point and the preferences of these end users.

At block 510, processing logic distributes the statistics to the relevant access points.

Figure 6:
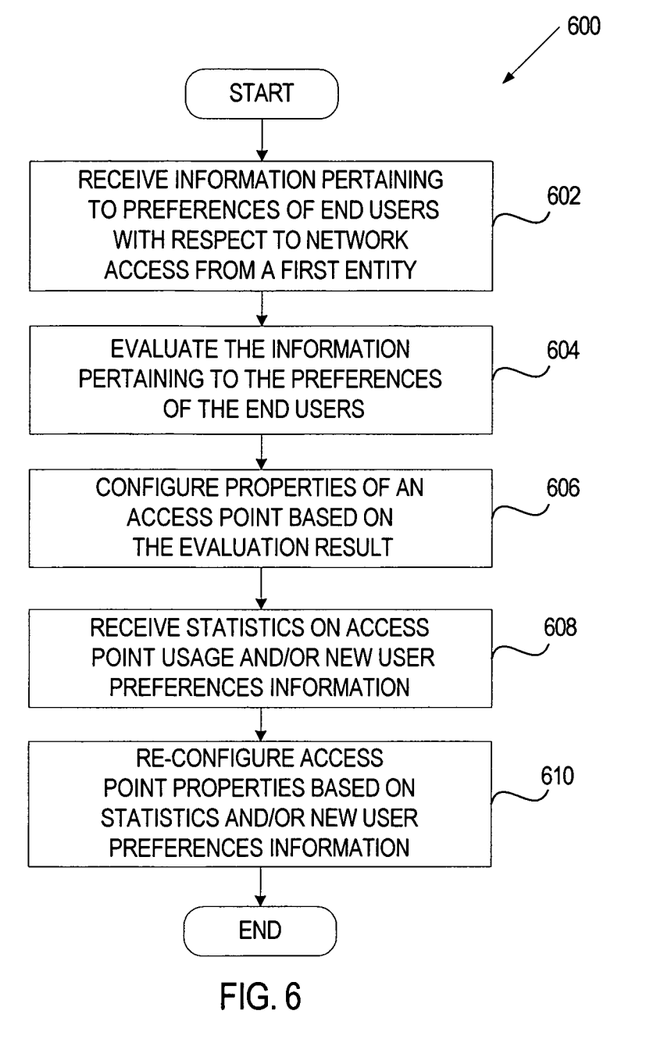
FIG. 6 is a flow diagram of one embodiment of a method for customizing an access point.

FIG. 6 is a flow diagram of one embodiment of a method 500 for customizing an access point. The method may be performed by processing logic, which may comprise hardware, software, or a combination of both. Processing logic may reside either in an access point, or partially or entirely in a separate device and/or system(s).

At block 602, processing logic receives information pertaining to preferences of end users with respect to network access. In one embodiment, the information pertaining to the preferences of end users is received from client devices obtaining network access via this access point. The received information may then be a collection of preferences of users of these client devices. In another embodiment, the information pertaining to the preferences of end users is received from the server (e.g., an advertisement provider server) that has collected this information from the client devices utilizing any of the access points associated with the server. In one embodiment, the information received from the server includes network access characteristics referenced in the user preferences and the number of users desiring the individual network access characteristics. In another embodiment, the information received from the advertisement provider includes network access characteristics desired by a large (e.g., over a predetermined percentage) number of end users.

At block 604, processing logic evaluates the information pertaining to the end user preferences to determine which combination of network access characteristics is likely to attract a large number of end users.

At block 606, processing logic configures the properties of the access point based on the evaluation result.

At block 608, processing logic receives new end user preferences and/or, in one embodiment, statistics on access point usage.

At block 610, processing logic reconfigures the properties of the access point based on the new end user preferences and/or statistics.

Exemplary Computer System

Figure 7:
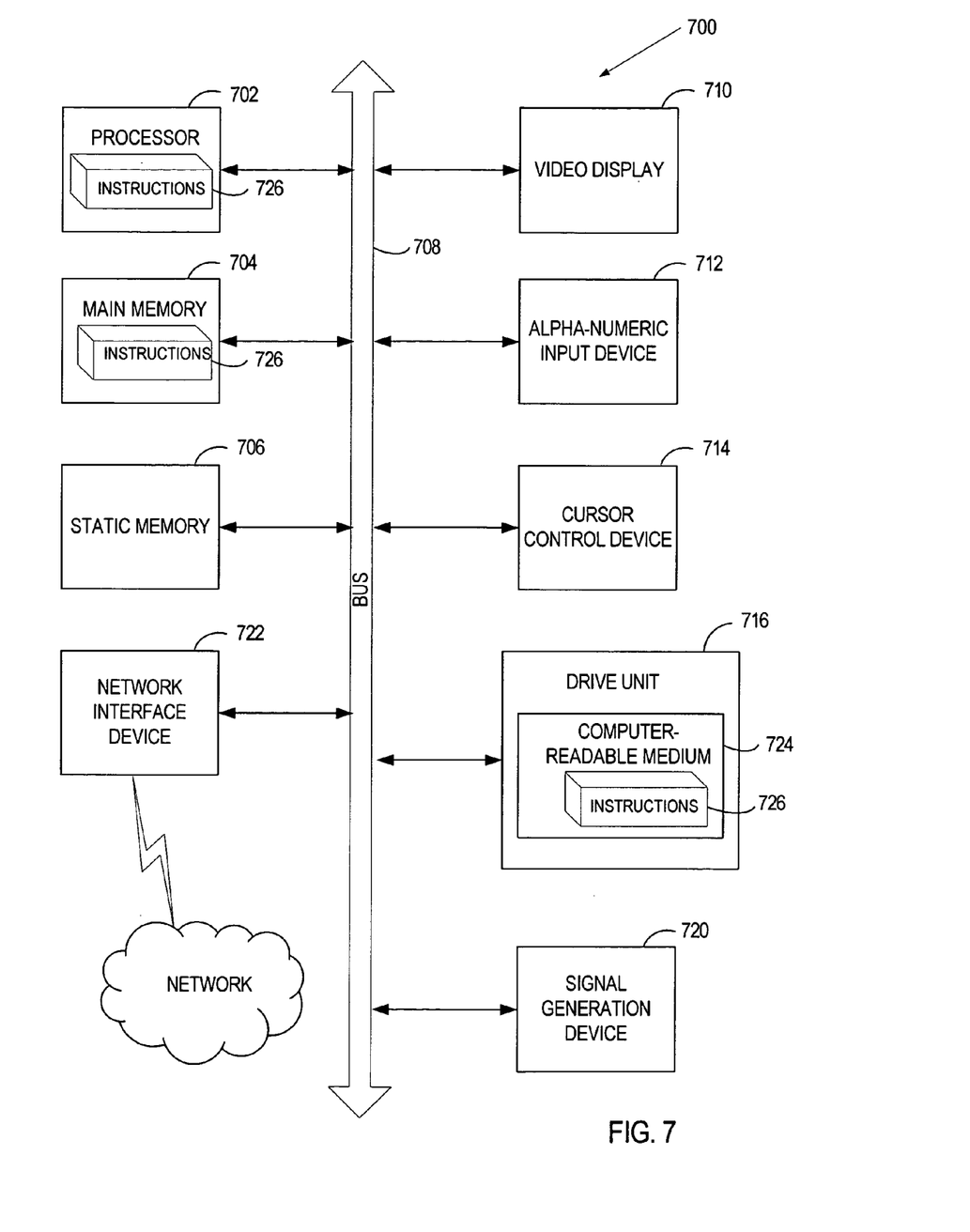
FIG. 7 is a block diagram of one embodiment of a computer system.

FIG. 7 shows a diagrammatic representation of a machine in the exemplary form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

General Legal Statements

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A computer-implemented method for a wireless access point (WAP), comprising:
receiving, at the WAP, information from an advertisement provider, the information pertaining to preferences of a plurality of end users with respect to network access characteristics to be provided by the WAP to any of the plurality of end users, the plurality of end users including end users that have used the WAP for network access and end users that have not used the WAP for network access, and wherein the preferences comprise a number of advertisements to be displayed on a screen;
identifying network access characteristics that are likely to increase a number of mobile devices utilizing the WAP for network access based on the preferences;
configuring, at the WAP, properties of the WAP based on the identified network access characteristics; and
providing, by the WAP, a network access experience to a plurality of subsequent users of the WAP, the network access experience defined by the configured properties of the WAP.

2. The method of claim 1 wherein the preferences of the plurality of end users with respect to the network access further comprise one or more of a desired speed of a provided connection, a desired level of security, and a desired type of a network connection.

3. The method of claim 1, wherein the identifying network access characteristics that are likely to increase a number of mobile devices utilizing the WAP for network access further comprises:
evaluating the information pertaining to the preferences of the plurality of end users.

4. The method of claim 1 further comprising: receiving statistics concerning the end users that have used the WAP for network access;
and re-configuring the properties of the WAP based on the statistics.

5. The method of claim 1 wherein the network access is Wireless Fidelity (WiFi) Internet Access.

6. The method of claim 1 wherein the WAP provides network access for the end users free of charge in exchange to consent of the end users to receive advertisements.

7. A computer-implemented method, comprising: receiving, at an advertisement provider, user preferences with respect to network access characteristics from each of a plurality of clients, the network access characteristics to be provided by a plurality of wireless access points (WAPs) to any of the plurality of clients, and wherein the preferences comprise a number of advertisements to be displayed on a screen;
creating, at the advertisement provider, information pertaining to preferences of a plurality of end users based on user preferences received from each of the plurality of clients; and
distributing the information pertaining to the preferences of the plurality of end users to the plurality of WAPs, wherein the information being distributed to an individual WAP pertains to end users that have used the individual WAP for network access and end users that have not used the individual WAP for network access, and wherein the individual WAP reconfigures its properties based on the distributed information to provide a network access experience to a plurality of subsequent users of the individual WAP.

8. The method of claim 7 wherein the user preferences with respect to the network access further comprise one or more of: a desired speed of a provided connection, a desired level of security, and a desired type of a network connection.

9. The method of claim 7 wherein creating, at the advertisement provider, information pertaining to preferences of a plurality of end users comprises:
evaluating the preferences of the plurality of end users;
determining, for each network access characteristic referenced in the preferences, a number of end users desiring said each network characteristic; and
including data identifying the number of end users desiring said each network characteristic in the information to be sent to the plurality of WAPs.

10. The method of claim 7 further comprising:
generating, for each of the plurality of WAPs, statistics concerning end users of said each of the plurality of WAPs; and
sending the statistics to said each of the plurality of WAPs.

11. The method of claim 7 wherein the network access is Wireless Fidelity (WiFi) Internet Access.

12. The method of claim 7 wherein the plurality of WAPs provide network access for the end users free of charge in exchange to consent of the end users to receive advertisements.

13. A wireless access point (WAP) apparatus, comprising:
a user preferences evaluator to receive, from an advertisement provider, information pertaining to preferences of a plurality of end users with respect to network access characteristics to be provided by the WAP to any of the plurality of end users, the plurality of end users including end users that have used the WAP for network access and end users that have not used the WAP for network access, and to identify network access characteristics that are likely to increase a number of mobile devices utilizing the WAP for network access, mad wherein the preferences comprise a number of advertisements to be displayed on a screen; and
an access point properties customizer to configure properties of the WAP based on the identified network access characteristics, the configured properties defining a network access experience to be provided by the WAP to a plurality of subsequent users of the WAP.

14. An advertisement provider apparatus comprising:
a user preferences collector to receive user preferences with respect to network access characteristics from each of a plurality of clients, the network access characteristics to be provided by a plurality of wireless access points (WAPs) to any of the plurality of clients, and wherein the preferences comprise a number of advertisements to be displayed on a screen;
a user preferences evaluator to create information pertaining to preferences of a plurality of end users based on user preferences received from each of the plurality of clients; and
a user preferences distributor to distribute the information pertaining to the preferences of the plurality of end users to the plurality of WAPs, wherein the information being distributed to an individual WAP pertains to end users that have used the individual WAP for network access and end users that have not used the individual WAP for network access, and wherein the individual WAP reconfigures its properties based on the distributed information to provide a network access experience to a plurality of subsequent users of the individual WAP.

15. An apparatus for a wireless access point (WAP), comprising:
means for receiving, at the WAP, information from an advertisement provider, the information pertaining to preferences of a plurality of end users with respect to network access characteristics to be provided by the WAP to any of the plurality of end users, the plurality of end users including end users that have used the WAP for network access and end users that have not used the WAP for network access, and wherein the preferences comprise a number of advertisements to be displayed on a screen;
means for identifying network access characteristics that are likely to increase a number of mobile devices utilizing the WAP for network access based on the preferences;
means for configuring, at the WAP, properties of the WAP based on the identified network access characteristics; and
means for providing, by the WAP, a network access experience to a plurality of subsequent users of the WAP, the network access experience defined by the configured properties of the WAP.

16. An apparatus comprising:
means for receiving, at an advertisement provider, user preferences with respect to network access characteristics from each of a plurality of clients, the network access characteristics to be provided by a plurality of wireless access points (WAPs) to any of the plurality of clients, and wherein the preferences comprise a number of advertisements to be displayed on a screen;
means for creating, at the advertisement provider, information pertaining to preferences of a plurality of end users based on user preferences received from each of the plurality of clients; and
means for distributing the information pertaining to the preferences of the plurality of end users to the plurality of WAPs, wherein the information being distributed to an individual WAP pertains to end users that have used the individual WAP for network access and end users that have not used the individual WAP for network access, and wherein the individual WAP reconfigures its properties based on the distributed information to provide a network access experience to a plurality of subsequent users of the individual WAP.

17. A computer readable medium comprising instructions, which when executed on a processing system, cause the processing system to perform a method for a wireless access point (WAP), the method comprising:
receiving, at the WAP, information from an advertisement provider, the information pertaining to preferences of a plurality of end users with respect to network access characteristics to be provided by the WAP to any of the plurality of end users, the plurality of end users including end users that have used the WAP for network access and end users that have not used the WAP for network access, and wherein the preferences comprise a number of advertisements to be displayed on a screen;

identifying network access characteristics that are likely to increase a number of mobile devices utilizing the WAP for network access;

configuring, at the WAP, properties of the WAP based on the identified network access characteristics; and providing, by the WAP, a network access experience to a plurality of subsequent users of the WAP, the network access experience defined by the configured properties of the WAP.

18. A computer readable medium comprising instructions, which when executed on a processing system, cause the processing system to perform a method comprising:

receiving, at an advertisement provider, user preferences with respect to network access characteristics from each of a plurality of clients, the network access characteristics to be provided by a plurality of wireless access points (WAPs) to any of the plurality of clients, and wherein the preferences comprise a number of advertisements to be displayed on a screen;

creating, at the advertisement provider, information pertaining to preferences of a plurality of end users based on user preferences received from each of the plurality of clients; and distributing the information pertaining to the preferences of the plurality of end users to the plurality of WAPs, wherein the information being distributed to an individual WAP pertains to end users that have used the individual WAP for network access and end users that have not used the individual WAP for network access, and wherein the individual WAP reconfigures its properties based on the distributed information to provide a network access experience to a plurality of subsequent users of the individual WAP.

* * * * *

UNITED STATES PATENT AND TRADEMARK OFFICE
CERTIFICATE OF CORRECTION

| | | |
|---|---|---|
| PATENT NO. | : 8,666,816 B1 | Page 1 of 1 |
| APPLICATION NO. | : 10/941491 | |
| DATED | : March 4, 2014 | |
| INVENTOR(S) | : Wesley T. Chan and Shioupyn Shen | |

It is certified that error appears in the above-identified patent and that said Letters Patent is hereby corrected as shown below:

In the Claims:

Column 8, line 44, in Claim 2, delete "of" and insert -- of: --, therefor.

Column 9, line 52, in Claim 13, delete "mad" and insert -- and --, therefor.

Signed and Sealed this
Tenth Day of June, 2014

Michelle K. Lee
*Deputy Director of the United States Patent and Trademark Office*